United States Patent [19]

Carey

[11] Patent Number: 4,475,195

[45] Date of Patent: Oct. 2, 1984

[54] APPARATUS FOR MICROPROCESSOR ADDRESS BUS TESTING

[75] Inventor: Richard A. Carey, Ashland, Mass.

[73] Assignee: Honeywell Information Systems Inc., Waltham, Mass.

[21] Appl. No.: 364,382

[22] Filed: Apr. 1, 1982

[51] Int. Cl.$^3$ .............................................. G06F 11/00
[52] U.S. Cl. ......................................... 371/16; 371/20
[58] Field of Search ....................... 371/16, 17, 18, 20

[56] References Cited

U.S. PATENT DOCUMENTS 3,988,603 10/1976 Griffin .................................... 371/29
4,308,615 12/1981 Koegel et al. ......................... 371/16

OTHER PUBLICATIONS

Farly, When Logic Analyzers Meet Development Systems, 9-13-1979, Electronics, p. 141.
Lowry, Skillfully Used Logic Analyzers Solve Problems Large and Small, EDN, Apr.20, 1977, p. 86.

Primary Examiner—Jerry Smith
Assistant Examiner—Mark Ungerman
Attorney, Agent, or Firm—George Grayson; Nicholas Prasinos

[57] ABSTRACT

An address bus of a central processor unit (CPU) is tested by generating repetitive "no operation" (NO OP) instructions. A microprocessor in the CPU receives the NO OP instruction code set manually into switches and generates sequential addresses on successive CPU cycles on the address bus. The microprocessor generates a read signal during each CPU cycle which is jumpered to portions of the logic to allow continuity of operation during test.

6 Claims, 4 Drawing Figures

APPARATUS FOR MICROPROCESSOR ADDRESS BUS TESTING

RELATED APPLICATION

The following U.S. patent application filed on an even date with the instant application and assigned to the same assignee as the instant application is related to the instant application and is incorporated herein by reference.

"Trap on Write Protected Memory" by Richard A. Carey and Jerry Falk, filed on Apr. 1, 1982 and having U.S. Ser. No. 364,381.

BACKGROUND OF THE INVENTION

1. Field of the Invention

This invention relates to an interactive terminal system in the data processing field, and more specifically to apparatus for testing the address bus of a microprocessor-controlled central processor unit.

2. Description of the Prior Art

As the semiconductor industry induces more complex and higher speed logic elements, data processing systems designed using these elements perform more complex logic functions and have higher systems throughput than data processing systems designed in the past. Many of the data processing systems are made up of microprogram controlled subsystems coupled in common to a system bus. Diagnostic testing systems have been developed for such microprogrammed data processing systems to check out each of the subsystems coupled to the system bus from a central source. U.S. Pat. No. 4,159,534 entitled "Firmware/Hardware System for Testing Interface Logic of a Data Processing System" describes a typical diagnostic test. This type of diagnostic test unfortunately makes it difficult to isolate a particular error. It is possible that the error is caused by a malfunction of the central source: the system bus, a subsystem that was not addressed, or a subsystem that was addressed.

Microprogrammed subsystems are designed with the capability to perform diagnostic tests independently of the remainder of the data processing system to which the subsystems are coupled. U.S. Pat. No. 4,019,033 entitled "Control Store Checking System and Method" describes a diagnostic system which verifies that the parity logic associated with each register tested has valid parity. This type of diagnostic tests the parity of each register in turn which receives predetermined data. Also the diagnostic does not force bad parity into the system to assure that the bad parity is detected.

The following are representative of typical techniques for testing data processor systems.

U.S. Pat. No. 3,566,093 entitled "Diagnostic Method and Implementation for Data Processors" describes the use of the parity error signal in a diagnostic routine for signalling erroneous access to a memory location or to provide a distinctive synchronization signal for test equipment while the memory is aided through a loop including locations under test.

U.S. Pat. No. 3,518,413 entitled "Apparatus for Checking the Sequencing of a Data Processing System" describes a diagnostic system in which a count of a number of cycles for a microprogram to reach a particular state is compared with the actual count of the number of cycles it took to reach that state.

U.S. Pat. No. 3,831,148 entitled "Nonexecute Test Apparatus" describes self-testing of a processing system under microinstruction control using parity checking apparatus.

U.S. Pat. No. 4,048,481 entitled "Diagnostic Testing Apparatus and Method" describes apparatus which is operative to condition data recovery to receive blocks of synchronization and data patterns arranged in a predetermined format to simulate data transfer from a peripheral device.

U.S. Pat. No. 4,038,537 entitled "Apparatus for Verifying the Integrity of Information Stored in a Data Processing System Memory" describes apparatus for adding together a column of bits including a parity bit in each bit location of a memory having a plurality of word locations, and comparing each sum with a predetermined parity bit of a parity word in one of the word locations.

However, what is required is a diagnostic tool for checking the address bus of a microprocessor-controlled central processor unit by incorporating a minimum of hardware into the central processor unit design.

It should be understood that the references cited herein are those of which the applicants are aware and are presented to acquaint the reader with the level of skill in the art and may not be the closest reference to the invention. No representation is made that any search has been conducted by the applicants.

OBJECTS OF THE INVENTION

It is an primary object of the invention to provide an improved central processor unit (CPU) in an interactive terminal system.

It is another object of the invention to provide an improved microprocessor-controlled CPU having means for readily testing address bus signals generated by the microprocessor.

It is still another object of the invention to provide signals to the microprocessor to generate the sequential sequence of address signals over the address bus.

It is yet another object of the invention for the CPU logic to be responsive to a microprocessor signal through jumpers to limit the CPU to testing of the address bus.

SUMMARY OF THE INVENTION

A system for testing the address bus of a central processor unit (CPU) includes a bank of manual switches, a microprocessor and a logic analyzer. The microprocessor and the bank of switches are a part of the CPU. The switches are set to the "no operation" (NO OP) instruction code, hexadecimal 90. The microprocessor is responsive to a series of repetitive NO OP instruction code signals to send out a sequence of addresses via address signals AD0 through AD7, A8 through A15 to a logic analyzer on successive CPU cycles. The addresses appear in sequence as hexadecimal 0000 through hexadecimal FFFF. This sequence is repeated as long as the microprocessor receives NO OP instruction code signals. The microprocessor generates a read $\overline{RD}$ signal which is jumpered to terminals to generate wait state control PROC RDY signals to initiate CPU cycles, to force a transceiver (data buffer) to conduct the switch signals to the microprocessor, and to select the appropriate switch bank. Another jumper grounds the CEN terminal of a bus controller suppressing all memory and input/output read and write operations.

An inspection of the logic analyzer will detect an address bus malfunction.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

DESCRIPTION OF THE PREFERRED EMBODIMENT

Figure 1:
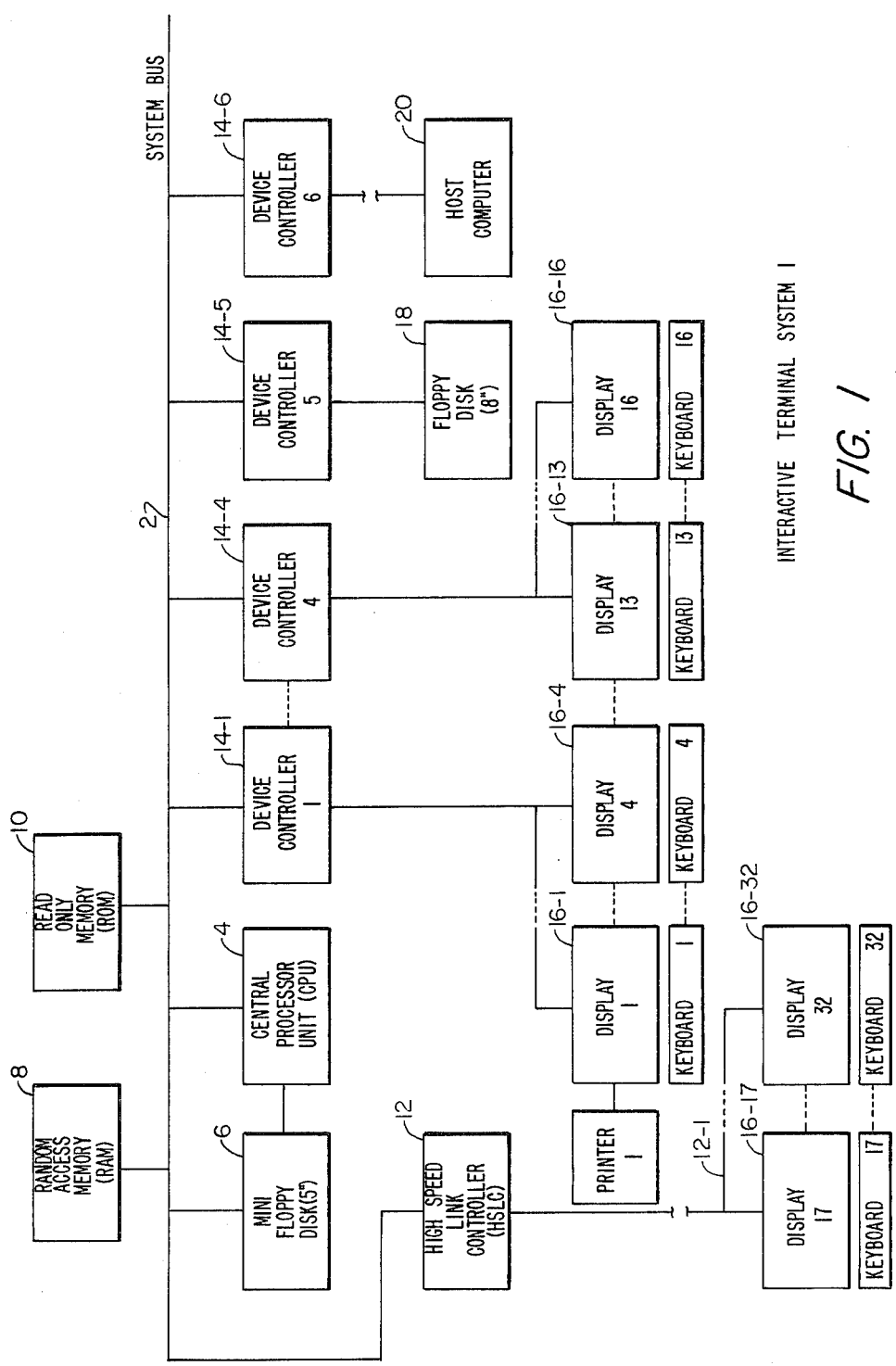
FIG. 1 is a block diagram of the interactive terminal system.

FIG. 1 shows a block diagram of a typical multi-application interactive terminal system 1. Operators seated at work stations may input information into the system via keyboards and receive requested information from the system via cathode ray tube (CRT) displays. A work station includes a keyboard and a display, and a printer if required by the application. The typical system of FIG. 1 has 32 work stations, display 1 and keyboard 1 16-1 through display 32 and keyboard 32 16-32. Note that printer 1 is included in the work station 16-1. Four work stations are coupled to each device controllers 14-1 through 14-4 for a total of 16 work stations, and 16 work stations are coupled to a high speed link controller (HSLC) 12. The HSLC 12 eases the connection of work stations by "dropping" them from a cable 12-1.

An 8 inch floppy disk 18 stores data pertinent to the application for which system 1 is used. As an example, when system 1 is used for an airline application, the floppy disk 18 may store information for passenger seat selection or for boarding pass generation. Floppy disk 18 is coupled to disk controller 14-5.

A host computer 20 may couple system 1 to a communication network for enabling communication with other terminal systems or other host computers in the network. Host computer 20 is coupled to device controller 14-6.

Device controllers 14-1 through 14-6 and HSLC 12 are coupled in common to a system bus 2 as are a central processor (CPU) 4, a random access memory (RAM) 8 and a read only memory (ROM) 10.

RAM 8 may store the operating system software, processor stack addresses and application programs. ROM 10 may store diagnostic programs for debugging system 1 as well as programs for initializing system 1 during the "Power On" sequence.

CPU 4 controls the operation by generating the system bus 2 timing cycles. The CPU 4 generates bus 2 cycle priorities. The RAM 8 chip refresh cycle has the highest priority. Next in priority is the bus 2 cycle called a DMA cycle for transferring information between RAM 8, ROM 10 or device controllers 14-1 through 14-4 and one of the device controllers 14-5 through 14-6 or HSLC 12. Following in priority is a screen refresh cycle for the CRT's of display 1 16-1 through display 16 16-16. The CPU 4 has the lowest bus 2 cycle priority. The CPU 4 is also responsive to instructions received from RAM 8 or ROM 10 for typically controlling the system 1 operation including branching to error routines, processing interrupts, and performing diagnostic routines as well as application programs.

Figure 2:
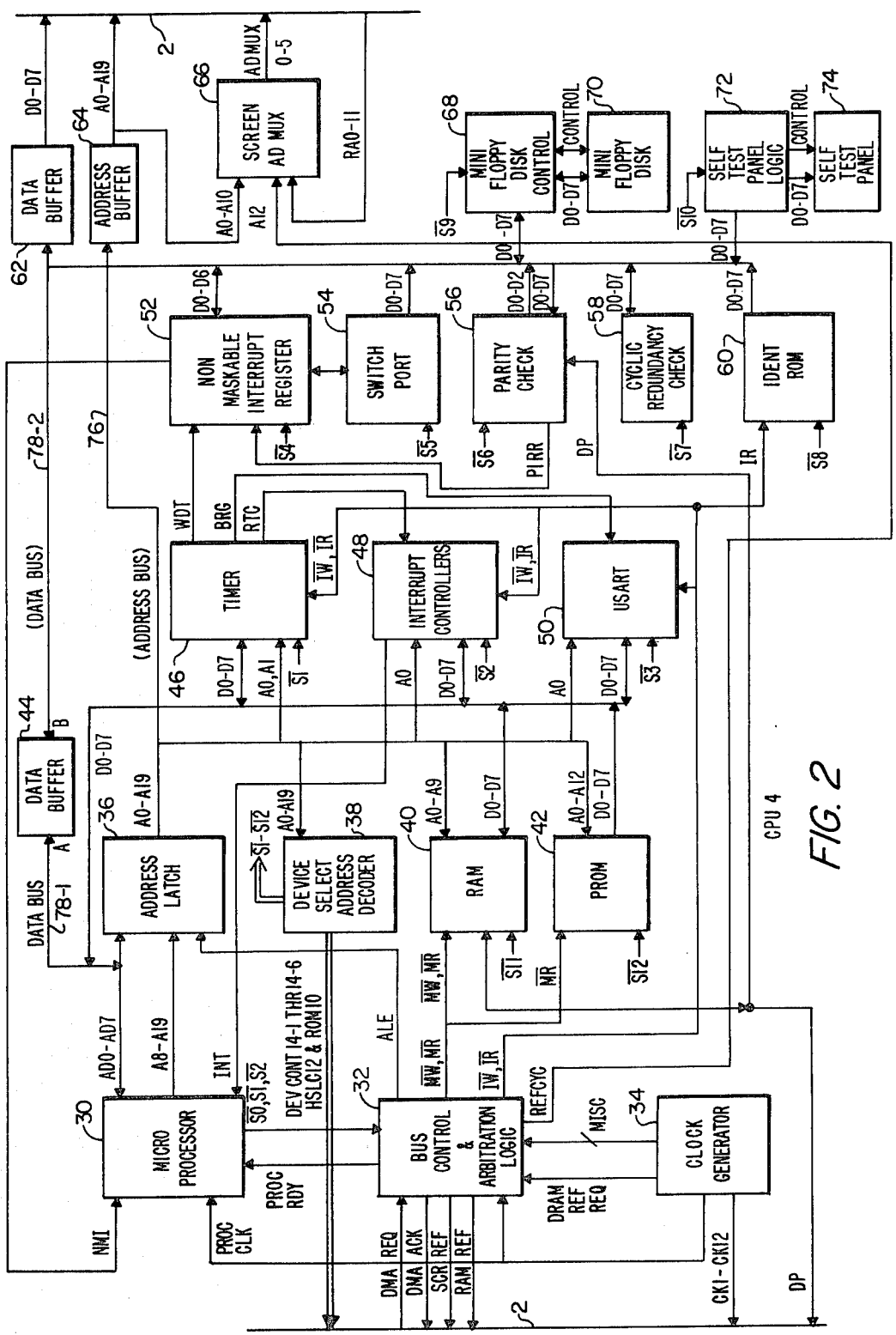
FIG. 2 is a block diagram of the central processor unit of the interactive terminal system.

Referring to FIG. 2, the CPU 2 includes an Intel 8088 microprocessor 30 which generates 20-bit address signals AD0 through AD7 and A8 through A19 during address cycle time. The signals AD0 through AD7 (D0–D7) are operative as bidirectional data signals during data cycle time. Address signals AD0 through AD7 and A8 through A19 are stored in an address latch 36 gated by an address latch enable signal ALE generated by a bus control and arbitration logic 32. This allows the signals AD0 through AD7 to transfer data during data cycle time. The address signals A0 through A19 from address latch 36 are transferred over address bus 76 to an address buffer 64 for transfer over system bus 2. Bidirectional data signals AD0 through AD7 appear on data bus 78-1 and/or data bus 78-2 as signals D0 through D7 at data cycle time.

A clock generator 34 generates the basic timing for system 1 by making sequential clock signals CK1 through CK12 available on system bus 2. A processor clock signal PROC CLK provides the basic timing for the microprocessor 30 and a bus control and arbitration logic 32. The PROC CLK signal is high between CK3 and CK5 time and between CK9 and CK11 time. Clock generator 34 also provides the RAM 8 refresh timing signal DRAM REF REQ. This results in the bus control and arbitration logic 32 to generate the RAM REF signal onto system bus 2 to refresh RAM 8. Also, a number of miscellaneous timing signals generated from clock signals CK1 through CK12 are applied to bus control and arbitration logic 32.

The bus control and arbitration logic 32 receives processor status signals S0, S1 and S2 to indicate the mode of operation such as I/O read, I/O write, memory read, amd memory write. The I/O operations refer to the microprocessor 30 communicating with one of the device controllers 14-1 through 14-6 or the HSLC 12 as well as all I/O operations within the CPU 4. The memory read or memory write operation refers to the transfer of information between the microprocessor 30 and either RAM 8, ROM 10, RAM 40 or PROM 42. Signal $\overline{MR}$ indicates a memory read out from RAM 40 or PROM 42 and signal $\overline{MW}$ indicates a memory write. Signal $\overline{IW}$ indicates an I/O write and signal $\overline{IR}$ indicates an I/O read operation. The processor ready signal PROC RDY indicates that the system bus 2 is busy and the microprocessor 30 should wait for the next nonbusy system bus 2 cycle. This will normally happen when the microprocessor 30 initiates a memory read, write or I/O cycle on system bus 2 since the memory cycle has a 2 CPU cycle duration. The address latch enable signal ALE as described supra gates the address signals AD0 through AD7 and A8 through A19 into the address latch 36.

The bus control and arbitration logic 32 responds to a device controller request signal DMA REQ with a device controller acknowledge signal DMA ACK indicating that the requesting device controllers 14-5, 14-6 or the HSLC 12 may communicate with RAM 8 or ROM 10 during a DMA bus 2 cycle. Also, screen refresh signal SCR REF indicates a display 1 16-1 through display 16 16-16 refresh cycle and RAM refresh signal RAM REF indicates a RAM 8 refresh cycle.

A device select address decoder 38 generates enable signals S1 through S12 in response to address signals A0 through A19 to enable 1 of 12 logic elements of CPU 4. The device select address decoder 38 also generates signal enable device controllers 14-1 through 14-6, HSLC 12 and ROM 10. One of the enable signals and the write signal $\overline{MW}$ or $\overline{IW}$ applied to a logic element will result the enabled logic element receiving a data byte via data bus 78-1 or 78-2 signals AD0 through AD7. If the read signal RD is applied to the enabled logic element, then the data bus 78-1 or 78-2 signals AD0 through AD7 (D0–D7) are stored in the enabled logic element.

A timer 46 acts as a watchdog timer, a real time clock, and a baud rate generator. A watchdog timer generates a signal WDT whenever an event that should have happened did not happen. A real time clock generates a signal RTC whenever the system desires an operation after a preset time. Signal BRG is applied to a USART 50 to generate the baud rate. Signal WDT is applied to a nonmaskable interrupt register which generates an NMI signal. The microprocessor is responsive to the NMI signal and branches to a firmware or software routine to recover from the fault that resulted in the WDT signal. The real time clock signal RTC is applied to interrupt controllers 48 which generates the INT signal which interrupts microprocessor 30. Microprocessor 30 enables interrupt controllers 48 via device select address decoder 38 and signal S2 to read the data byte onto data bus 78-1 to identify the interrupting device to branch to the subroutine that will process that interrupt. Address signals A0 and A1 select the mode of operation of timer, the baud rate generator, watchdog timer, or real time clock. Data bus 78-1 signals D0 through D7 set or read the count in the timer 46.

The interrupt controllers 48 has 16 levels of interrupt level 1 having the highest priority interrupt and level 16 having the lowest level of interrupt. Address signal A0 indicates that an interrupt is requested when the enabling signal S2 is present.

The universal synchronous/asynchronous receive transmit controller (USART) 50 is capable of controlling communication lines which are coupled directly to the USART 50. Signal S3 enables the USART 50 which transmits data received from data bus 78-1 signals AD0 through AD7, and receives data which it transfers to data bus 78-1 signals AD0 through AD7. The baud rate is generated by timer 46 and applied to USART 50 by signal BRG.

A 1K X 9 RAM 40 stores the interrupt vectors. Four 8-bit bytes are reserved for each of the 16 interrupt levels to point to the program to process the interrupt. The program may be stored in RAM 40 or in RAM 8. Address signals A0 through A9 address the 1024 byte locations.

A PROM 42 optional from 8K to 32K bytes may store the routines to initialize the CPU 4 during "Power Up". This loads RAM 40, interrupt controllers 48 and timer 46.

An address buffer 64 buffers the address signals A0 through A19 for transfer over system bus 2. The address buffer 64 is deactivated during the DMA system bus 2 cycle when one of the device controllers 14-5, 14-6 or the HSLC 12 is communicating with RAM 8, ROM 10 or device controllers 14-1 through 14-4 since the device controllers 14-5 through 14-6 or the HSLC 12 is generating the RAM 8, ROM 10 or device controllers 14-1 through 14-4.

Screen AD MUX 66 is a multiplexer which selects either the address signals A0 through A10 and A12 or refresh address signals RA0 through RA11 from screen refresh memory (not shown) to generate refresh address signals ADMUX 0 through ADMUX 5 which are used to access and refresh the screen refresh memory. The screen refresh memory refreshes display 1 16-1 through display 16 16-16.

The nonmaskable interrupt register generates the NMI signal to interrupt the microprocessor 30 during power failure, the sensing of a parity error signal PERR from parity check 56, in addition to the watchdog timer error described supra.

Switch port 54 contains switches for inputting miscellaneous signals including instructions for testing various CPU 4 functions and registers for storing addresses or configuration data during particular applications.

Parity check 56 receives data bus 78-2 signals D0 through D7 and DP, generates parity or checks for a parity error and indicates by data signals D0 through D2 if the parity error is a CPU 4 error or a DMA error. Parity bit DP is stored in RAM 40, RAM 8 and device controllers 14-1 through 14-4.

A cyclic redundancy check 58 is operative with USART 50 to generate during the transmit operation or to verify during the receive operation the cyclic redundancy check character.

An identification ROM 60 may store an identification number to identify the interactive terminal system 1. This is particularly needed when system 1 is part of a large communication system and assures the sending device that the addressed system 1 responded.

A self test panel 74 containing test light emitting diodes (LEDS), communication LEDS or a test switch is coupled to the data bus 78-2 via self test panel logic to manipulate the CPU 4 manually.

A mini floppy disk 70 is coupled to the data bus 78-2 via a mini floppy disk control 68 to store additional programs or to store a record of all transactions processed by the CPU 4.

Figure 3:
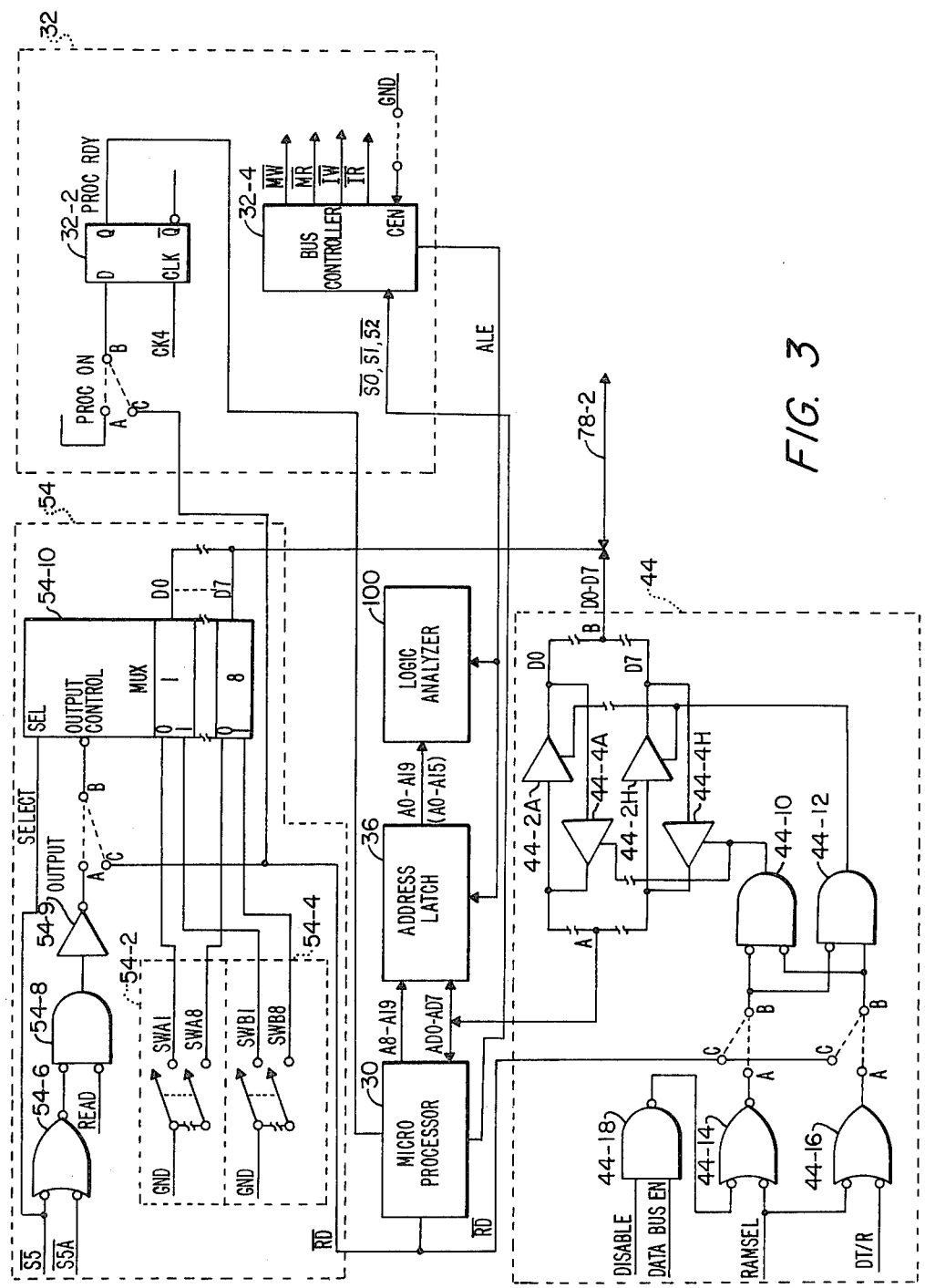
FIG. 3 is a logic diagram showing the logic affecting by the removal and addition of jumpers.

Referring to FIG. 3, the switch port 54, FIG. 2, includes switch banks SWA 54-2 and SWB 54-4, each made up of 8 single pole-single throw switches SWA1 through SWA8 and SWB1 through SWB8. The 16 switches are mounted directly on the CPU 4 logic board. A multiplexer (MUX) 54-10 selects the 8 switches SWA1 through SWA8 54-2 or the 8 switches SWB1 through SWB8 54-4 for transfer onto data bus 78-2 as data signals D0 through D7. During normal operation, either the 0 terminal of the 1 terminal of MUX 54-10 is selected when signal S5 from device select address decoder 38, FIG. 2, is applied to the select terminal of MUX 54-10. The output of MUX 54-10 is enabled when either signal S5 or S5A from decoder 38 applied to a negative OR gate 54-6 is low. (MUX 54-10 is a 74S257 circuit.) When microprocessor 30 specifies a read operation via signals S0, S1 and S2, FIG. 2, a READ signal generated by bus control and arbitration logic 32 is applied to a NAND gate 54-8. The READ signal low generates an OUTPUT signal via an inverter 54-9 and jumper terminals A and B (dotted) to the output control terminal of MUX 54-10 when the output of negative OR gate 54-6 is low. The OUTPUT signal low enables the outputs of MUX 54-10 which generates data signals D0 through D7.

For the address bus 76 test, the switches SWB1 through SWB8 54-4 are set with the NO OPERATION instruction code hexadecimal 90, that is switches SWA5 and SWA8 are closed and the switches SWA1 through SWA4, SWA6 and SWA7 remain open. During the POWER ON sequence, the microprocessor generates the signal $\overline{RD}$. If the jumper end in the OUTPUT signal was removed from terminal A and placed in terminal C so that the OUTPUT signal line is now open, the output of MUX 54-10 is enabled by signal $\overline{RD}$ and the NO OP code $90_{16}$ appears on the data bus 78-2. Switches SWB1 through SWB8 54-2 are selected since signal S5 applied to the SEL terminal of MUX 54-10 is forced high.

The data buffer 44 are 74LS245 bidirectional data transceivers which send data bus signals D0 through D7 from terminal B to terminal A when a NAND gate 44-10 is operative and signals AD0 through AD7 from terminal A to terminal B when a NAND gate 44-12 is operative. Note that signals AD0 through AD7 are active at both address out time and data in time, FIG. 4. Signals D0 through D7 are active only during data in time.

A RAMSEL signal from RAM 40, FIG. 2, is applied to a negative OR gate 44-14 and a NOR gate 44-16 to indicate that a RAM 40 read or write cycle is requested. The RAMSEL signal low is applied to the NAND gate 44-12 via negative OR gate 44-14 and NOR gate 44-16 during normal operation to enable 8 drivers 44-2A through 44-2H and to cause the data bus signals D0 through D7 from RAM 40 to be applied to the parity check 56, FIG. 2, through the data buffer 44 in the A to B direction. This occurs during both a RAM 40 read and a RAM 40 write operation. Note that the data signals AD0 through AD7 are transferred directly between the microprocessor 30 and RAM 40 and through data buffer 44 as signals D0 through D7 to parity check 56.

A DT/R signal from bus control and arbitration logic 32 indicates a write operation when low and a read operation when high. Signal DT/R high applied to NOR gate 44-16 enables NAND gate 44-10 causing 8 drivers 44-4A through 44-4H to transfer the data bus 78-2 signals D0 through D7 through data buffer 44 from B to A. Note that driver 44-4A transfers signal D0 and driver 44-4H transfers signal D7. The drivers that transfer signals D1 through D6 from A to B and from B to A are not shown to simplify FIG. 3.

Signal DT/R low applied to NOR gate 44-16 enables NAND gate 44-12 causing 8 drivers 44-2A through 44-2H to transfer the data bus signals AD0 through AD7 from A to B.

During normal operation, both the DISABLE signal from interrupt controller 48 and the data bus enable signal DATA BUS EN from bus control and arbitration logic 32 are high forcing the output of a NAND gate 44-18 low. This enables both NAND gates 44-10 and 44-12 through negative OR gate 44-14. Note that either the DISABLE signal or the DATA BUS EN signal low disables NAND gates 44-10 and 44-12 putting data buffer 44 in a high impedance mode. (The 74LS245 is a tristate transceiver. The 3 states at each data bus signal terminal are high, low or high impedance.)

During the test mode, the jumpers are transferred from terminal A in the negative OR gate 44-14 output circuit to terminal C, and from terminal A in the NOR gate 44-16 output circuit to terminal C. Therefore during the power up sequence, signal $\overline{RD}$ is applied to both NAND gates 44-10 and 44-12. NAND gate 44-10 is enabled and NAND gate 44-12 is disabled causing the output of switches SWB1 through SWB8 54-4 set to $90_{16}$, the NO OP instruction, to be transferred over data bus 78-2 signals D0 through D7 to microprocessor 30 via data buffer 44 and data bus 78-1 signals AD0 through AD7.

The microprocessor 30 receives the NO OP instruction $90_{16}$ and increments the address counter from $0000_{16}$ to $0001_{16}$. The microprocessor 30 address signals appear on address signal lines AD0-AD7 and A8-A15 and are stored in address latch 36 when gated by signal ALE from bus controller 32-4.

The wave shape of the address bus 76 signals A0 through A15 are displayed typically on the scope of the Hewlett Packard logic analyzer 100, Model No. 1615A. Microprocessor 30 again generates the $\overline{RD}$ signal which results in another NO OP instruction being transferred from switch bank SWB1 through SWB8 54-4 to microprocessor 30 advancing the address counter from $0001_{16}$ to $0002_{16}$ and generating another $\overline{RD}$ signal.

This operation is repeated and the address bus 76 signals A0 through A15 are displayed consecutively from $0000_{16}$ through $FFFF_{16}$ on the logic analyzer 100. The pattern is such that any address bus 76 malfunction is readily discernible.

During normal operation, the microprocessor 30 is enabled by setting the processor ready flop 32-2 of bus control and arbitration logic 32 at CK4 clock time. The flop is set by the PROC ON signal when there is no DMA cycle, no chip refresh cycle and no screen refresh operation with a processor access. The output of flop 32-2, signal PROC RDY, activates the microprocessor 30.

During the test operation, the jumper on terminal A in the PROC ON signal circuit is plugged into terminal C resulting in the RD signal setting the processor ready flop 32-2 if the flop 32-2 happened to be reset. Also, the command enable terminal CEN of bus controller 32-4 is grounded by a jumper. This forces the output command signals $\overline{MW}$, $\overline{MR}$, $\overline{IW}$ and $\overline{IR}$ to an inactive state preventing all I/O and memory read and write operations, even though signals S0, S1 and S2 are generated. The address latch enable signal ALE, however, is available to clock the address signals AD0 through AD7 and A8 through A19 into an address latch 36 and also to synchronize the logic analyzer 100 to the address bus 76 signals A0 through A15.

Microprocessor 30 is an Intel 8088 microprocessor and bus controller 32-4 is an Intel 8288 bus controller described in "The 8086 Family Users' Manual, October 1979", published by Intel Corporation, 3065 Bowers Avenue, Santa Clara, Calif. 95051.

Figure 4:
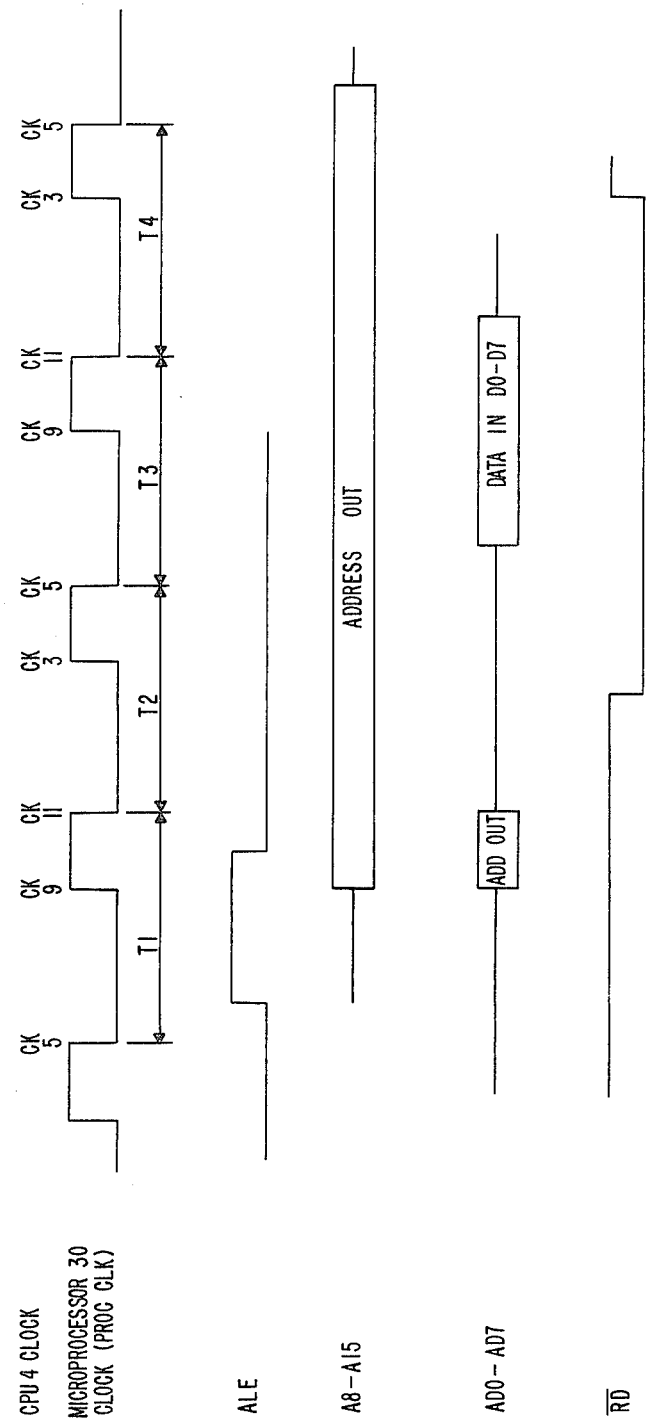
FIG. 4 is a timing diagram showing the relationship of the $\overline{RD}$ signal with the address bus and data bus.

The test operation is shown by the timing diagram of FIG. 4. The CPU 4 sequential clock signals CK1 through CK12 generated by clock generator 34, FIG. 2, are shown in FIG. 4 with the microprocessor 30 clock, the PROC CLK signal. Microprocessor 30 T1 and T3 cycles fall at CK5 time and rise at CK9 time, and the T2 and T4 cycles fall at CK11 time and rise at CK3 time.

The ALE signal from bus controller 32-4 gates the address out signals AD0 through AD7 and A8 through A15. Note that the data bus 78-1 carries address information during T1 time and data information during T3 time. The RD signal suppresses normal CPU 4 activity during T3 time when the NO OP instruction $90_{16}$ is on the data bus.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. Apparatus for testing an address bus over which are transmitted a plurality of address signals representative of addresses in numerical order, the plurality of address signals being generated by a microprocessor on successive cycles of operation, said apparatus comprising:

switching means for storing a plurality of data signals representative of a predetermined instruction code operatively coupled to a first timing signal;

microprocessor means coupled to said switching means and responsive to the plurality of data signals for generating the plurality of address signals, and generating the first timing signal, said microprocessor means including bus control means for generating a second timing signal during said successive cycles of operation;

latching means coupled to said microprocessor means for storing the plurality of address signals in response to said second timing signal during said successive cycles of operation for transmission over said address bus;

analyzer means coupled to said latching means and said microprocessor means for receiving the plurality of address signals on said address bus in response to the second timing signal; and jumper means coupled to said microprocessor means for enabling said successive cycles of operation in response to the plurality of data signals.

2. The apparatus of claim 1 wherein said switching means comprises:

a bank of switches manually set to generate the plurality of data signals, wherein said predetermined instruction code indicated by the plurality of data signals is representative of a no operation (NO OP) instruction.

3. The apparatus of claim 2 wherein said microprocessor means comprises:

transceiver means coupled to said switching means, said jumper means and said microprocessor and responsive to the first timing signal applied to the transceiver means by a first jumper to receive the plurality of data signals for transfer to said microprocessor.

4. The apparatus of claim 3 wherein said microprocessor means further comprises:

processor ready means coupled to said microprocessor and said jumper means and responsive to the first timing signal applied to the processor ready means by a second jumper to generate a first signal for enabling said microprocessor.

5. The apparatus of claim 4 wherein said microprocessor means further comprises:

said microprocessor for generating the first timing signal during an initialization sequence, said microprocessor being coupled to said transceiver means for receiving the plurality of data signals during a first of said successive cycles of operation, and generating a first and subsequent plurality of address signals and the first timing signal during a second and subsequent successive cycles of operation wherein each subsequent plurality of address signals is representative of said addresses incremented by one, said microprocessor further generating a plurality of command signals in response to the first signal.

6. The apparatus of claim 5 wherein said microprocessor means further comprises:

bus controller means coupled to said microprocessor and responsive to the plurality of command signals to generate the second timing signal, said bus controller including a command enable terminal coupled to a ground terminal by a third jumper thereby forcing said bus controller command output signals to an inactive state.

* * * * *